(12) United States Patent
Vonier

(10) Patent No.: US 11,655,889 B2
(45) Date of Patent: May 23, 2023

(54) STEERING COLUMN FOR A MOTOR VEHICLE

(71) Applicants: thyssenkrupp Presta AG, Eschen (LI); thyssenkrupp AG, Essen (DE)

(72) Inventor: Felix Vonier, Schruns (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 367 days.

(21) Appl. No.: 16/652,784

(22) PCT Filed: Oct. 19, 2018

(86) PCT No.: PCT/EP2018/078721
§ 371 (c)(1),
(2) Date: Apr. 1, 2020

(87) PCT Pub. No.: WO2019/081368
PCT Pub. Date: May 2, 2019

(65) Prior Publication Data
US 2020/0240508 A1    Jul. 30, 2020

(30) Foreign Application Priority Data

Oct. 23, 2017    (DE) .................. 10 2017 218 897.9

(51) Int. Cl.
*F16H 57/021*     (2012.01)
*B62D 5/04*       (2006.01)
*F16C 35/067*     (2006.01)

(52) U.S. Cl.
CPC ......... *F16H 57/021* (2013.01); *B62D 5/0463* (2013.01); *B62D 5/0409* (2013.01);
(Continued)

(58) Field of Classification Search
CPC ........... F16H 57/021; F16H 2057/0213; B62D 5/0463; B62D 5/0409; F16C 35/067; F16C 2326/24; F16C 2361/61
See application file for complete search history.

(56) References Cited

U.S. PATENT DOCUMENTS 9,205,860 B2 * 12/2015 Kwon .................. B62D 5/0409
9,505,433 B2 * 11/2016 Kimoto ............... B62D 5/0409
(Continued)

FOREIGN PATENT DOCUMENTS

CN    102083676 A    6/2011
CN    204726501 U   10/2015
(Continued)

OTHER PUBLICATIONS

English Translation of International Search Report issued in PCT/EP2018/078721, dated Jan. 30, 2019.
(Continued)

*Primary Examiner* — Kevin Hurley
*Assistant Examiner* — Michael R Stabley
(74) *Attorney, Agent, or Firm* — thyssenkrupp North Amercia, LLC

(57) ABSTRACT

An electromechanical power steering system for a motor vehicle includes a worm shaft which can be driven by an electric motor and which meshes with a worm wheel coupled to a steering shaft. The worm shaft is rotatably mounted in a bearing which has at least one bearing ring fitted in a retainer that can be displaced relative to the worm wheel. In order to specify an electromechanical power steering system having an improved retainer, which has (Continued)

higher dimensional stability and increased stiffness, according to the invention the retainer has a main body of plastic, which is injection-molded onto the bearing ring as an injection-molded part.

19 Claims, 2 Drawing Sheets

(52) U.S. Cl.
CPC ........ *F16C 35/067* (2013.01); *F16C 2326/24* (2013.01); *F16C 2361/61* (2013.01); *F16H 2057/0213* (2013.01)

(56) References Cited

U.S. PATENT DOCUMENTS

| | | | |
|---|---|---|---|
| 9,568,044 B2* | 2/2017 | Kang | F16H 57/0006 |
| 10,054,194 B2* | 8/2018 | Kwon | F16H 1/16 |
| 2008/0199114 A1 | 8/2008 | Schust | |
| 2010/0260448 A1 | 10/2010 | Hafermalz | |
| 2011/0155499 A1 | 6/2011 | Wilkes et al. | |
| 2012/0217085 A1 | 8/2012 | Sekikawa | |
| 2015/0360719 A1 | 12/2015 | Kang | |
| 2016/0348727 A1 | 12/2016 | Shaikh | |
| 2017/0217476 A1 | 8/2017 | Schlegel | |

FOREIGN PATENT DOCUMENTS

| | | |
|---|---|---|
| DE | 100 10 838 A | 9/2001 |
| DE | 10 2005 035 020 A | 2/2007 |
| DE | 603 12 120 T | 11/2007 |
| DE | 10 2011 015 883 A | 10/2012 |
| DE | 10 2014 106 259 A | 11/2015 |
| DE | 10 2014 110 306 A | 1/2016 |
| DE | 20 2017 100 155 U | 3/2017 |
| EP | 2 578 470 A | 4/2013 |
| JP | 2005247241 A | 9/2005 |
| JP | 2012077269 A | 4/2012 |
| KR | 10 2010 0102347 A | 9/2010 |

OTHER PUBLICATIONS

AUTODESK.Help: "Anspritzpunkte", (Jan. 2, 2017).
Wikipedia: "Polyoxymethylen", accessed Sep. 13, 2018, (https://de.wikipedia.org/w/index.php title=Polyoxymethylen&oldid=170160876).
Krause, Thomas.: "SKF Produkte und Bauteile aus Kunststoffen", (Jun. 2, 2016).

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2018/078721, filed Oct. 19, 2018, which claims priority to German Patent Application No. DE 10 2017 218 897.9, filed Oct. 23, 2017, the entire contents of both of which are incorporated herein by reference.

FIELD

The present disclosure generally relates to an electromechanical power steering system for a motor vehicle.

BACKGROUND

In power-assisted steering systems of motor vehicles, in addition to the manual steering torque which is introduced into the steering shaft by the driver as a steering command via the steering wheel fitted to the input side, an additional auxiliary torque is coupled into the steering column in order to assist the manual steering torque for a steering angle of the wheels.

In a generic electromechanical power steering system, the manual steering torque is measured by means of a torque sensor, for example by measuring the relative torsion of a rotary rod incorporated between an input and an output shaft of the steering shaft. Depending on the measured steering torque, the necessary power assistance is determined in an electric control unit, and an electric actuating drive is activated accordingly. The actuating drive has an electric motor for producing an auxiliary torque, which is coupled into the steering shaft.

According to the generic type, the auxiliary torque is coupled in via a worm gear mechanism, which has a worm shaft which is coupled to the motor shaft of the electric motor and which engages in a worm wheel. The worm wheel is co-rotationally connected to the steering shaft, for example to the output shaft, which is usually connected to the steering pinion of a steering mechanism, in which the steering pinion engages in a rack which converts a rotation of the steering shaft into a translational movement of track rods and, as a result, into a steering lock of the steered wheels.

In order to increase the smooth running and as far as possible to avoid the production of noise during the load change caused by the steering movements, it is known to preload the steering shaft elastically relative to the worm wheel in the direction of the tooth engagement. Such an arrangement is described in the prior art, for example in DE 10 2014 110 306 A1. In the latter, the worm shaft is rotationally mounted at its end remote from the motor in a bearing which is accommodated in a retainer, in which a bearing ring which forms an outer part of the bearing is co-rotationally fitted. The retainer is displaceably fitted in the worm gear mechanism in such a way that the bearing ring can be moved in the direction toward the toothing of the worm wheel, by which means the worm shaft can be preloaded to mesh without play in the toothing of the worm wheel. For example, a spring, which acts on the retainer and presses the worm shaft elastically without play against the toothing of the worm wheel, can be provided as a loading element.

In the known embodiment, an outer bearing ring of the bearing, formed as a rolling bearing, is inserted into a receiving opening of the retainer and fixed in a force-fitting manner. In order to produce a sufficiently firm seat, it is necessary to form the receiving opening to be intrinsically elastic, or to introduce an elastically flexible intermediate element between bearing ring and retainer. The disadvantage here is restricted dimensional stability, the relatively low stiffness of the connection of the bearing to the retainer, and detrimental long-term stability, which can lead to undesired play and noise. In addition, the assembly is complicated.

Thus a need exists for a steering system having an improved retainer which has higher dimensional stability and increased stiffness.

DETAILED DESCRIPTION

Figure 1:
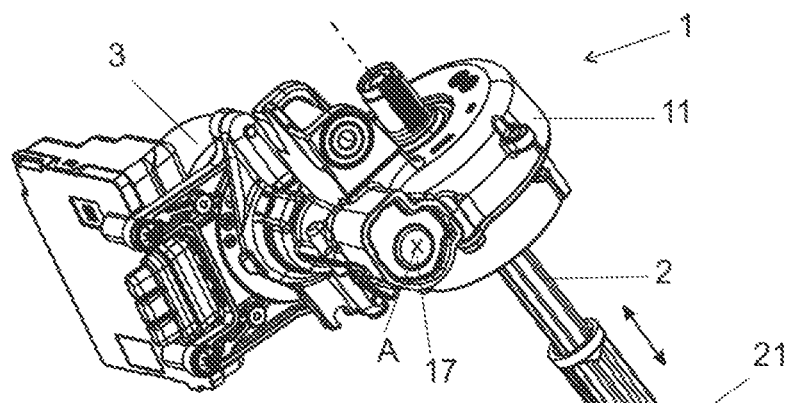
FIG. 1 is a schematic perspective view of a power steering system for a motor vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to an electromechanical power steering system for a motor vehicle, comprising a worm shaft which can be driven by an electric motor and which meshes with a worm wheel coupled to a steering shaft, wherein the worm shaft is rotatably mounted in a bearing which has at least one bearing ring fitted in a retainer that can be displaced relative to the worm wheel.

According to the invention, for a power steering system for a motor vehicle, comprising a worm shaft which can be driven by an electric motor, which meshes with a worm wheel coupled to a steering shaft, wherein the worm shaft is rotatably mounted in a bearing, which has at least one bearing ring that can be mounted in a retainer which can be moved relative to the worm wheel, it is proposed that the retainer has a main body made of plastic, which is injection-molded onto the bearing ring as an injection-molded part.

The main body of the retainer according to the invention is formed as an injection-molded part made of thermoplastic, for example polypropylene (PP), polyoxymethylene (POM) or the like, which permits logical production of accurate shape and dimensions. The bearing ring, for example an outer raceway of a rolling bearing, is integrated according to the invention into the retainer during the production in the injection-molding method by overmolding with the plastic. For this purpose, the raceway is positioned in the cavity of the injection mold, which is subsequently filled with molten plastic. Following cooling, a particularly durable integral connection is produced between the plastic and the bearing ring, which in the case of a rolling bearing normally consists of steel. The connection can additionally be configured in a form-fitting manner, by the bearing ring having form-fitting elements in the region of its overmolded surfaces, which are enclosed by the plastic melt during the overmolding and are embedded in the plastic body in a form-fitting manner. The form-fitting elements can be produced, for example, by ruffling, ribbing or grooving or by other profiling introduced in a material-removing or non-material removing manner.

The overmolding according to the invention permits precise positioning of the bearing ring in the retainer, coupled with the advantage of lower outlay on production as compared with the subsequent assembly usual in the prior art.

A further advantage is that the connection offers higher strength and stiffness than the press connections known in the prior art. Furthermore, the connection is stable in the long term over the service life of the steering.

Preferably, the main body can be formed as an eccentric lever which has a pivoting bearing with a pivot axis which is at a distance from the axis of the bearing. Such an eccentric or pivoting lever is rotatably mounted via the pivoting bearing on a part of the power steering system that is stationary relative to the worm wheel, and permits a pivoting movement about the pivot axis, which means that the bearing ring and therefore the worm shaft mounted in the bearing can be moved in the direction of the toothing of the worm wheel.

The pivot axis can be arranged substantially parallel to the axis of the worm shaft. The fact that the bearing axes of worm shaft and pivoting bearing are aligned transversely with respect to the worm wheel axis, which may be identical to the steering shaft axis, means that the worm shaft can be displaced substantially parallel to the toothing engagement, virtually no or only slight angular offset occurring in the bearing.

Provision can be made for the pivoting bearing to have a bearing element molded onto the main body. The bearing element can be, for example a bearing bore, which can be formed in one piece in the main body produced as an injection-molded part. A bearing pin can be rotatably arranged in the bearing bore to form the pivoting bearing. The bearing pin can be supported in a sliding manner directly in the plastic material of the main body. A long-term smooth-running mounting can be achieved, for example, by means of a bearing pin made of steel or non-ferrous metal or plastic, which is mounted in the thermoplastic polymer of the main body, which means that the bearing movement resulting from the slight pivoting movements occurring during operation is ensured with little wear and reliably in the long term. Alternatively, it is conceivable and possible to injection-mold onto the main body an additional bearing element, for example a bearing bush or bearing ring of a sliding or rolling bearing made of a material that is different from the plastic of the main body. In production terms, this can be carried out in one operation during the injection molding, as in the bearing ring of the bearing of the worm shaft.

It is advantageous that at least one injection point is arranged in the region between the bearing and the pivoting bearing. Via the position of the injection point, the filling of the cavity during the injection of the plastic melt and, as a result, the propagation of the flow front can be predefined during the injection molding, which permits production-based optimization of the workpiece properties of the plastic part. In the main body according to the invention, the most uniform plastic filling possible, both in the region of the injected bearing ring and the pivoting bearing, is advantageous. This can be done by similarly long flow paths in the filling of the injection point located between the bearing and the pivoting bearing.

The bearing ring injection molded onto the main body can form an outer ring of the bearing formed as a rolling bearing, which has rolling elements arranged in a rolling manner between the outer ring and an inner ring. The rolling bearing can be provided as a finished structural element and overmolded as a whole, so that the outer ring is connected to the main body.

An advantageous embodiment of the invention provides for the retainer to have a damper element projecting outward, which is formed from an elastomer that is different from the plastic of the injection molded part. The damper element is arranged on the outside of the main body and can, for example, project radially outward with respect to the bearing, in order to support the retainer on a part that is stationary with respect to the worm shaft, for example on a gear mechanism housing accommodating the worm shaft and the worm wheel. The elastomer is preferably resilient and softer than the polymer material of the main body, and permits mechanically damped support of the retainer. As a result, damaging vibrations can be attenuated, which increases the smooth running.

Preferably, the damper element is injection-molded onto the main body. The fact that the damper element is formed from a thermoplastic elastomer means that it can be injection-molded onto the main body in the two-component injection molding process. As a result, a durable, integral connection between the main body and the damper element is produced in a logical manner.

The fact that the damper element is injected into a concave recess in the main body ensures precise, unambiguous relative positioning. In addition, a stable and particularly durable form-fitting connection is additionally produced.

Preferably, the worm shaft and the worm wheel are arranged in a gear mechanism housing, on which the retainer is movably mounted. The gear mechanism housing serves the relative mounting of the gear mechanism elements, here the worm shaft and the worm wheel meshing therewith. In practical terms, the mounting of the worm shaft remote from the motor can be carried out in the bearing in the retainer which, for example, can be formed as a pivoting lever, which is attached to the gear mechanism housing such that it can be pivoted about the pivot axis. An alternative or additional mounting of the retainer on the gear mechanism housing is likewise conceivable and possible, for example about an additional pivot axis. Furthermore, the gear mechanism housing can comprise a mounting of the worm shaft close to the motor, for example a rolling mounting, and a holder for the electric motor, which can be flange-mounted on the gear mechanism housing with its motor shaft coaxial with the worm shaft. The worm wheel is preferably rotatably mounted about the steering shaft axis in the gear mechanism housing.

A preloading element, which can preload the retainer elastically in the direction of the worm wheel, can act on the retainer. The preloading element used can be, for example, a spring, which is supported on the gear mechanism housing and acts on the retainer, so that its spring force loads the bearing of the worm shaft elastically in the direction of the worm wheel.

FIG. 1 shows a power steering system 1 which is attached to a steering shaft 2, which is rotatably mounted about its longitudinal axis L, the steering shaft axis. The steering shaft 2 is co-rotationally but adjustably in the direction of the longitudinal axis L in a rear steering shaft part 21, as indicated by the double arrow, in order to adjust a steering wheel attached to a fixing section 22, not illustrated here, in the longitudinal direction.

Figure 2:
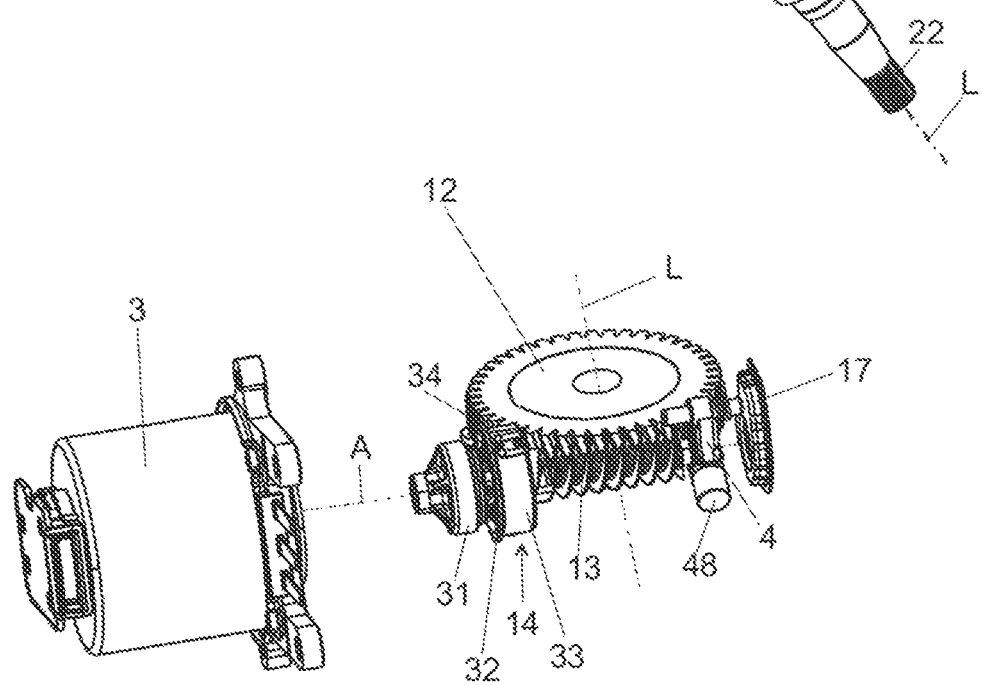
FIG. 2 is a schematic view of the drive of the power steering system according to FIG. 1 without a housing.
Figure 3:
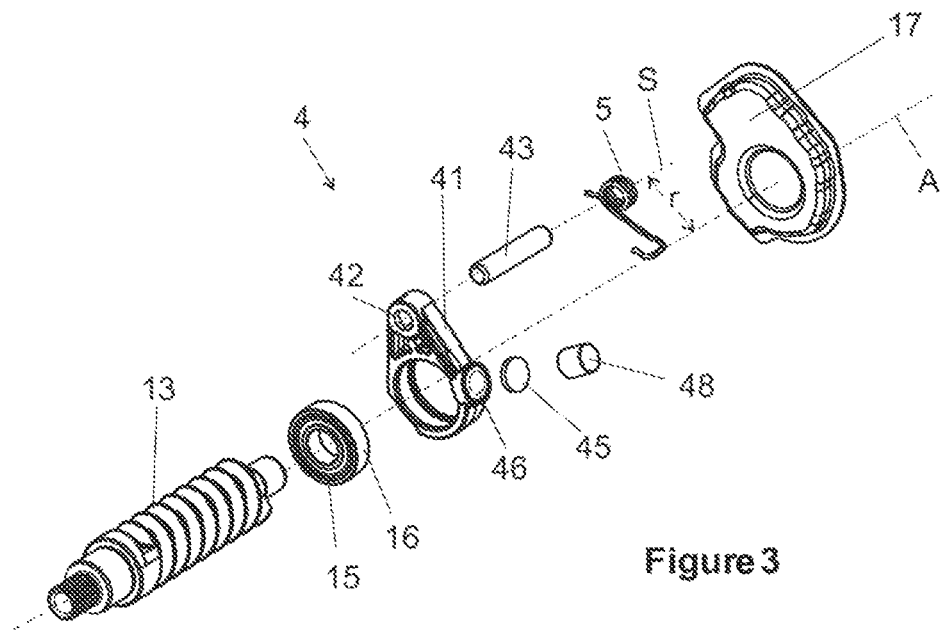
FIG. 3 is a schematic partial view of the power steering system according to FIG. 2.

The power steering system has a gear mechanism housing 11, which has been left out in the exploded illustration of FIGS. 2 and 3. In the gear mechanism housing 11, a worm wheel 12, which is co-rotationally connected to the steering shaft 2, is rotatably mounted about the longitudinal axis L. A worm shaft 13 meshes with the toothing of the worm wheel 12 to form a worm gear mechanism.

The worm shaft 13 is rotatably mounted in the gear mechanism housing 11 about an axis A, the worm wheel axis, and can be driven in rotation by an electric motor 3 flange-mounted on the gear mechanism housing 11. The electric motor 3 has a motor shaft which is co-rotationally coupled to the worm shaft 13 via a coupling 31, which consists of two coupling parts. For this purpose, the worm shaft 13 has a cylindrical bearing bush, into which a coupling part is inserted. On the side close to the motor, the worm shaft 11 adjacent to the coupling 31 is mounted in a bearing 14, preferably a rolling bearing, which is accommodated in the housing 11. Between the gear mechanism housing 11 and the bearing arrangement 14 close to the motor, a seal element 230 can be provided, which is arranged on one side of the bearing arrangement 14 adjacent to the coupling part or on both sides of the bearing arrangement 14. The rolling bearing 14 comprises an inner ring, rolling elements and an outer ring. The rolling elements run in grooves between the inner ring and the outer ring. The outer ring is accommodated relative to the axis of rotation in a pivoting ring 33. On the outer circumferential side, the outer ring has a spherical surface, which is curved convexly and which forms a contact surface relative to a contact surface on the pivoting ring 33. The contact surface of the pivoting ring 33 is curved convexly, so that the outer ring is pivotable as a pivotable bearing element in the pivoting ring 33 about a pivot axis located perpendicular to the worm shaft axis A. The pivot axis in the unloaded state extends centrally through the bearing arrangement 14, so that two spring elements 34 are pierced centrally by the pivot axis 22. As a result, the spring elements 34 thus produce only low forces, in a range of less than 5%, as compared with an adjustable preload, for example via a preloading device on a side of the worm shaft 13 remote from the motor. At the end remote from the motor, the worm shaft 13 is mounted in a retainer 4, which is formed as a pivoting lever and is explained in more detail in the illustration of FIGS. 3 to 5.

The exploded illustration of FIG. 3 reveals that a bearing 15 is arranged on the side of the worm shaft 13 that is remote from the motor, which bearing is preferably formed as a rolling bearing, for example as a deep groove ball bearing, and has an outer bearing region 16. The bearing 15 is fitted in the retainer 4 so as to be displaceable relative to the worm wheel 12.

Figure 4:
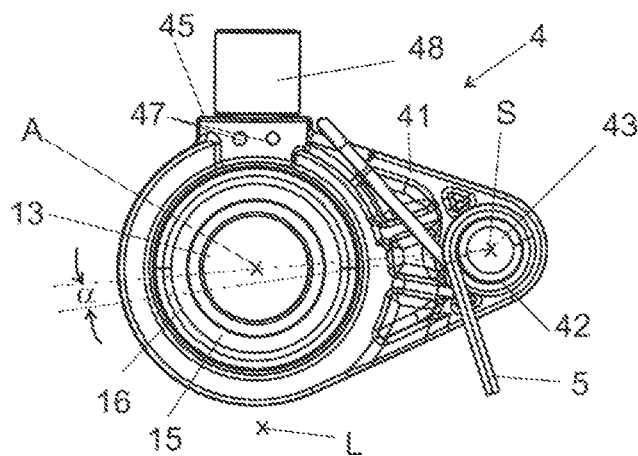
FIG. 4 is an axial view of a retainer of the power steering system according to FIGS. 1-3 in the direction of the bearing axis.
Figure 5:
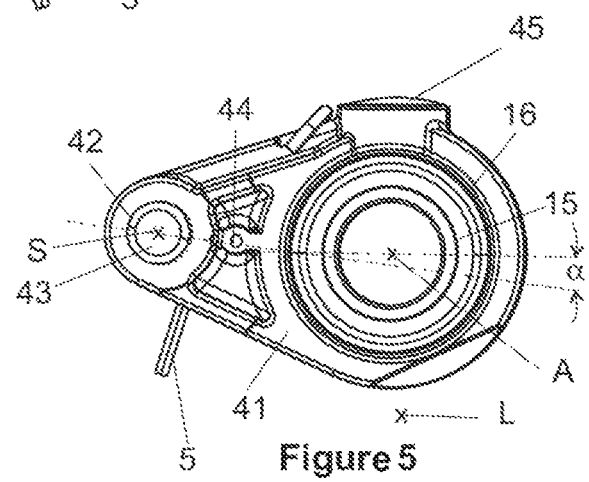
FIG. 5 is an opposite axial view of the retainer of the power steering system according to FIGS. 1-3.

The retainer 4 has a main body 41, which is formed as an injection-molded part made of thermoplastic polymer. The bearing region 16 is connected to the main body 41 by overmolding, as can be seen in FIGS. 4 and 5, which show axial views from opposite axial directions of the axis A.

Formed in the main body 41 of the retainer 4 is a pivoting bearing 42, having a bearing opening that is continuous in the direction of a pivot axis S. The pivot axis S extends at a distance r, the pivoting radius, substantially parallel to the axis A.

In the pivoting bearing 42, the retainer 4 is rotatably mounted about a bearing pin 43, which is attached to a bearing cover 17 connected to the housing. As a result, the bearing 15, which is fixed in the main body 41 by overmolding the bearing region 16 and the axis A of which is at a distance from the pivot axis S by the pivoting radius defined by the distance r, can be moved toward the longitudinal axis L by pivoting by a pivot angle a about the pivot axis S, as illustrated in FIGS. 4 and 5. As a result, the worm shaft 13 can be moved in the direction of the tooth engagement with the worm wheel 12 that can be rotated about the longitudinal axis L.

Arranged on the bearing pin 43 is a spring 5, which is formed as a leg spring. The spring 5 is supported by one leg on the gear mechanism housing 11, the other leg rests with the spring force on the retainer 4, and loads the arm of the pivoting bearing that accommodates the bearing 15 in the direction of the longitudinal axis L. As result, the worm shaft 13 is loaded elastically without play in mesh with the toothing of the worm wheel 12.

The bearing ring 16 is overmolded with the thermoplastic polymer of the main body 41. To this end, the bearing 15 is arranged in the cavity of an injection mold of the main body 41, into which the plastic melt is injected via a nozzle arranged at an injection point 44. As can be seen clearly in FIG. 5, the injection point 44 is arranged in the main body 41 between the bearing ring 16 and the pivoting bearing 42, for example approximately centrally, as in the embodiment shown. This ensures that the bearing ring 16 is overmolded uniformly with the plastic, and also the pivoting bearing 42 can be injection-molded with low production tolerances as a result of the short flow path of the melt.

Arranged on the outside of the main body 41 is a damper element 45. The latter is flat or convex, as illustrated in FIG. 5, and is formed at right angles to the worm shaft axis A.

The damper element 45 is made of a thermoplastic elastomer which is softer and more elastic than the polymer of the main body 41. To connect it to the damper element 45, the main body 41 has a concave recess 46 in the form of a cylindrical blind hole. In the example shown, two injection openings 47 are arranged in the wall of the recess 46, through which openings the elastomer material for forming the damper element 45 is injected in molten form in the injection molding. As a result, the damper element 45 is connected integrally and in a form-fitting manner in the recess 45 by injection molding with the main body 41. The damper element 45 cooperates with a substantially cylindrical preloading element 48 made of plastic. The preloading element 48 preloads the worm shaft 13 radially via the retainer 4 with a preloading force, by which means the worm shaft 13 is urged in the direction of the worm wheel 12, which contributes to improving the engagement between worm shaft 13 and worm wheel 12. It is conceivable and possible that the preloading element 48 is injection-molded directly into the recess 46 of the retainer 4 and therefore forms the damper element. The latter is substantially cylindrical and extends radially outward with respect to the longitudinal axis L from the main body 41, to be specific in the opposite direction as seen from the longitudinal axis L, as shown schematically in FIG. 4.

In the installed state, the preloading element 48 is supported on the gear mechanism housing 11 in the direction opposite to the tooth engagement, and ensures high smooth running as a result of reliable attenuation of vibrations.

By means of the bearing ring 16 connected to the main body 41 by injection molding according to the invention, long-term stable, rigid attachment of the bearing 15 to the retainer 4 is achieved. The damper element 45, likewise injection-molded onto the retainer 4, is connected firmly and reliably to the retainer over the entire service life.

LIST OF DESIGNATIONS

1 Power steering system
11 Housing
12 Worm wheel
13 Worm shaft
14 Bearing
15 Bearing
16 Bearing ring
17 Bearing cover
2 Steering shaft
21 Steering shaft part
22 Fixing section
3 Electric motor
31 Coupling
32 Sealing element
33 Pivoting ring
34 Spring element
4 Retainer
41 Main body
42 Pivoting bearing
43 Bearing pin
44 Injection point
45 Damper element
46 Recess
48 Preloading element
5 Spring
L Longitudinal axis
A Axis (worm shaft axis)
S Pivot axis
r Distance
α Pivot angle

What is claimed is:

1. An electromechanical power steering system for a motor vehicle, comprising:
   a steering shaft;
   an electric motor;
   a worm shaft configured to be driven by the electric motor; and
   a worm wheel coupled to the steering shaft and operatively meshed with the worm shaft;
   wherein the worm shaft is rotatably mounted in a bearing that has at least one bearing ring fitted in a retainer that is configured to displace relative to the worm wheel; and
   wherein the retainer has a main body of plastic, which is injection-molded onto the bearing ring as an injection-molded part, wherein the main body is configured as an eccentric lever that has a pivoting bearing with a pivot axis that is spaced apart from an axis of the bearing, wherein at least one injection-molding point is disposed in the region between the bearing and the pivoting bearing.

2. The power steering system of claim 1 wherein the pivot axis is substantially parallel to the axis of the worm shaft.

3. The power steering system of claim 1 wherein the pivoting bearing has a bearing element injection-molded onto the main body.

4. The power steering system of claim 1 wherein the bearing ring forms an outer ring of the bearing formed as a rolling bearing.

5. The power steering system of claim 1 wherein the retainer has a damper element projecting outwardly, which is formed from an elastomer that is different from the plastic of the injection-molded part.

6. The power steering system of claim 5 wherein the damper element is injection-molded onto the main body.

7. The power steering system of claim 1 wherein the worm shaft and the worm wheel are arranged in a gear mechanism housing, on which the retainer is movably mounted.

8. The power steering system of claim 1 comprising a preloading element that elastically preloads the retainer in the direction of the worm wheel.

9. An electromechanical power steering system for a motor vehicle, comprising:
   a steering shaft;
   an electric motor;
   a worm shaft configured to be driven by the electric motor;
   a worm wheel coupled to the steering shaft and operatively meshed with the worm shaft;
   a bearing in which the worm shaft is rotatably mounted; and
   a retainer in which a bearing ring of the bearing is fitted, the retainer being configured to be displaced relative to the worm wheel, wherein the retainer includes:
      a main body of plastic, which is injection-molded onto the bearing ring as an injection-molded part, and
      a damper element that projects radially outward relative to a radially outermost portion of the bearing ring, with the damper element being disposed in a plane in which an entirety of a circumference of the bearing ring is disposed.

10. The power steering system of claim 9 wherein an axial extent of the damper element is equal to or greater than an axial extent of the bearing ring.

11. The power steering system of claim 9 wherein the damper element is comprised of an elastomer that is different from the plastic of the injection-molded part.

12. The power steering system of claim 9 wherein the worm shaft and the worm wheel are arranged in a gear mechanism housing, on which the retainer is movably mounted.

13. The power steering system of claim 9 comprising a preloading element that elastically preloads the retainer in a direction of the worm wheel, wherein the main body is configured as an eccentric lever that has a pivoting bearing with a pivot axis that is spaced apart from an axis of the bearing, wherein coils of the preloading element are disposed about the pivot axis.

14. An electromechanical power steering system for a motor vehicle, comprising:
   a steering shaft;
   an electric motor;
   a worm shaft configured to be driven by the electric motor;
   a worm wheel coupled to the steering shaft and operatively meshed with the worm shaft;
   a bearing in which the worm shaft is rotatably mounted; and a retainer in which a bearing ring of the bearing is fitted, the retainer being configured to be displaced relative to the worm wheel, wherein the retainer includes:
  a main body of plastic, which is injection-molded onto the bearing ring as a first injection-molded part, and
  a damper element that projects outward from the retainer, wherein the damper element is a second injection-molded part that is disposed in a concave recess of the main body,
wherein the concave recess of the main body is configured as a cylindrical blind hole into which the damper element is injected.

15. The power steering system of claim 14 wherein the bearing ring forms an outer ring of the bearing formed as a rolling bearing.

16. The power steering system of claim 14 comprising a preloading element that elastically preloads the retainer in a direction of the worm wheel, wherein the main body is configured as an eccentric lever that has a pivoting bearing with a pivot axis that is spaced apart from an axis of the bearing, wherein coils of the preloading element are disposed about the pivot axis.

17. The power steering system of claim 14 wherein the damper element is comprised of an elastomer that is different from the plastic of the first injection-molded part.

18. The power steering system of claim 14 wherein the worm shaft and the worm wheel are arranged in a gear mechanism housing, on which the retainer is movably mounted.

19. The power steering system of claim 14 comprising an injection opening in a wall that forms the concave recess.

* * * * *